July 8, 1952 — E. W. VREDENBURG — 2,602,626
BAG FILLING AND WEIGHING DEVICE
Filed Feb. 13, 1946 — 2 SHEETS—SHEET 1
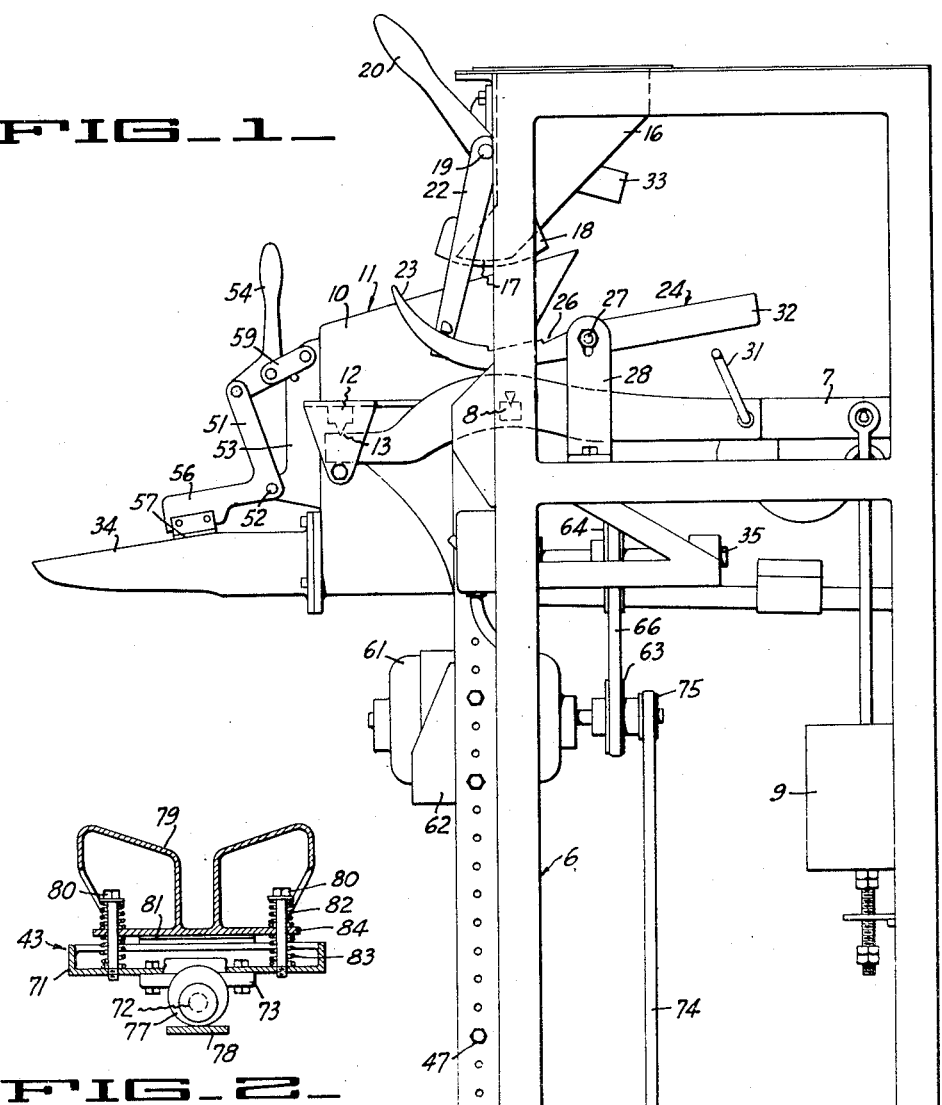
FIG_1_
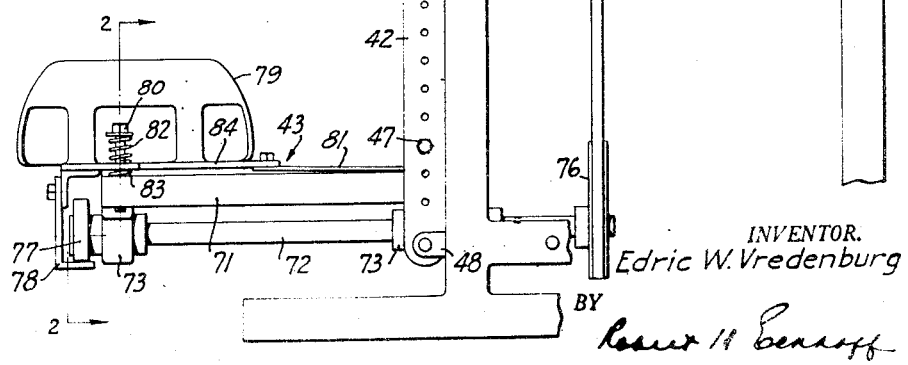
FIG_2_
INVENTOR.
Edric W. Vredenburg
BY
ATTORNEY July 8, 1952  E. W. VREDENBURG  2,602,626
BAG FILLING AND WEIGHING DEVICE
Filed Feb. 13, 1946  2 SHEETS—SHEET 2
FIG_3_
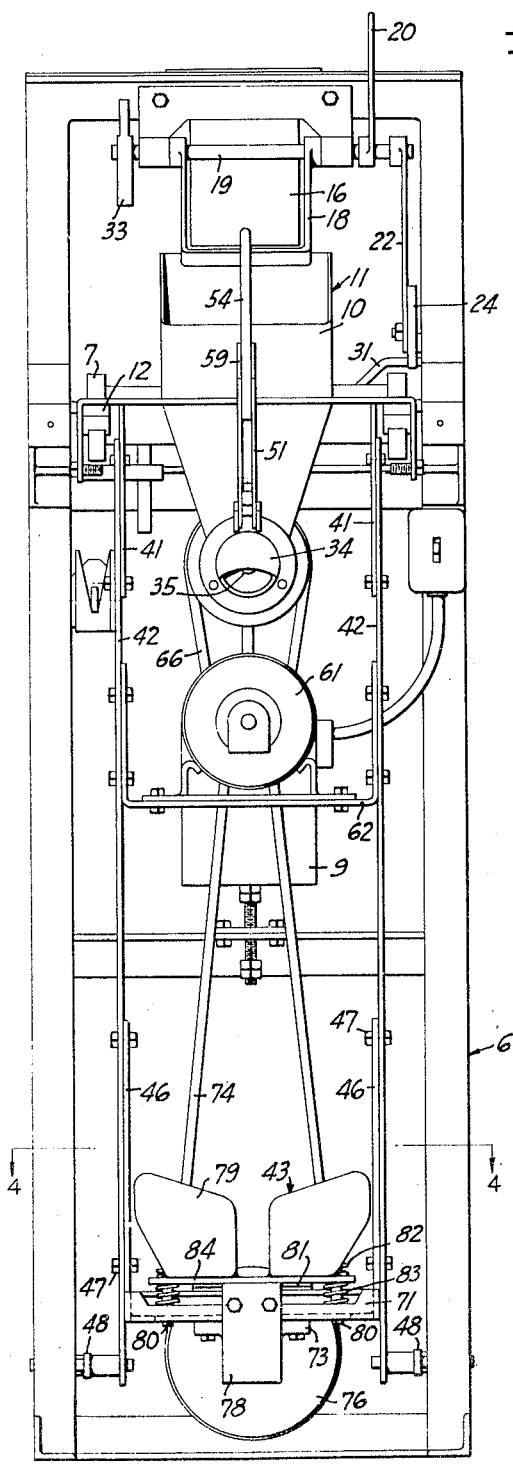
FIG_4_
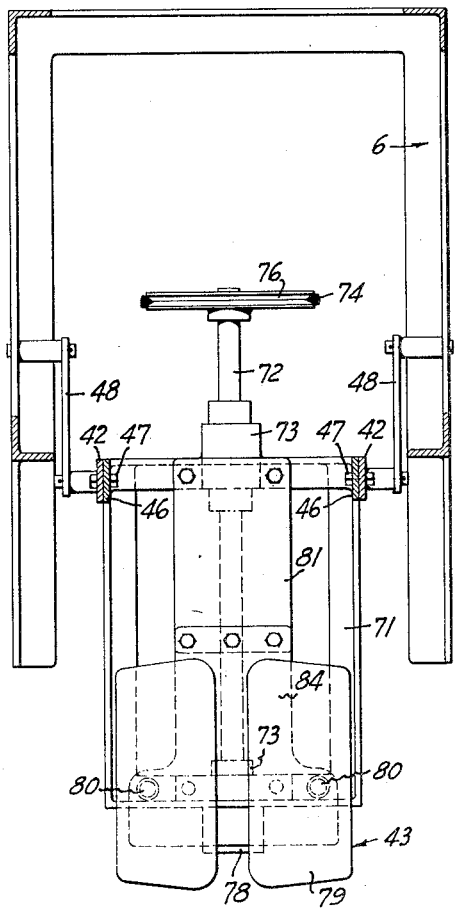
INVENTOR.
Edric W. Vredenburg
BY
ATTORNEY Patented July 8, 1952

2,602,626

UNITED STATES PATENT OFFICE 2,602,626

BAG FILLING AND WEIGHING DEVICE

Edric W. Vredenburg, Berkeley, Calif.

Application February 13, 1946, Serial No. 647,231

5 Claims. (Cl. 249—60)

This invention relates to charge weighing and filling machines, particularly one for weighing a charge of a material to be loaded into a bag. The machine of this invention is particularly suited for filling that type of container known in the art as a valved bag, a term applied to a bag which is closed before filling except for a small filling opening or valve which is closed after filling.

The machine of the present invention includes a weighing mechanism supporting an intermediate temporary storage receptacle or hopper. The hopper includes a spout for discharge of the charge into a container, usually a valved bag. The hopper and bag are mounted upon and carried by the weighing frame, the load of the empty bag and hopper being counterbalanced on the weighing frame so the charge of material in the hopper or in the bag can be weighed. The movement of the weighing frame is utilized to control discharge of material from a source into the hopper, the frame cutting off discharge when the charge of a desired weight is contained in the hopper and/or the bag. The weighing and filling machine described will fill a bag in a period which is very short as compared to the period required by prior machines. I have found that the weighing-filling period can be further reduced by vibrating the hopper and bag support frame. The vibrator is provided as part of the support means for the bag bottom. When the vibrator is actuated with an empty bag in place, the vibration is imparted to the frame and speeds up flow from the hopper. As the bag fills, the material in it takes up the vibration and that of the frame is reduced. The effect of this is to pack the fill in the bag compactly and to reduce gradually the rate of discharge from the hopper. These two results follow each other, a very desirable feature enabling the rate of feed to be increased and then reduced while the bag fill is compacted into a tight pack as it is placed in the bag. The extent of vibration of the bag is diminished and finally the vibration is discontinued as the bag fills so that the operator can remove the bag without difficulty.

The invention includes other objects and features of advantage, some of which, together with the foregoing, will appear hereinafter wherein the present preferred form of machine of this invention is disclosed.

In the drawing accompanying and forming a part hereof, Figure 1 is a side elevation of a machine embodying the invention.

Figure 2 is a section along the line 2—2 of Figure 1.

Figure 3 is a front view of the machine shown in Figure 1.

Figure 4 is a section along the line 4—4 of Figure 3.

Referring to Figure 1, I have provided a suitable supporting frame indicated generally at 6 for supporting the scale beam or weighing frame 7 in balance bearings or pivot blocks 8. The weighing frame has the form and configuration generally shown at 21 in Figure 3 in my Patent 2,314,299. A counterbalance 9 is hung on one end of the frame while a hopper structure generally indicated at 11 including a main hopper 10 is mounted by pivot blocks 12 on pivots 13 at the other end of the weighing frame. This type of mounting is shown and described in some detail in my aforesaid patent.

To provide for feed of material, a container 16 is provided above the hopper structure 11 in a position to discharge through opening 17 into hopper 10. A movable gate 18 is mounted on shaft 19 and is oscillated across opening 17 by handle 20 secured to shaft 19. Normally handle 20 is rocked counterclockwise (Figure 1) by an operator until lever 22 on shaft 19 has moved across arcuate face 23 on lever 24 and is engaged with notch 26.

The lever 24 is hinged at 27 intermediate its ends on a member 28 which is mounted on one side of the frame. The lever 24 is free to rock counterclockwise to admit the end of lever 22 into the notch; its clockwise movement is restricted by an adjustable stop 31 carried on the weighing frame below the extending end 32 of lever 24. This serves to release the engagement of lever 22 and notch 26, enabling counterweight 33 on shaft 19 to rock the shaft and gate 18 clockwise and shut off material flow.

The hopper 10, as appears in Figure 1, tapers in toward its bottom to direct the flow of material into an intermediate hopper and bag filling spout generally indicated at 34. A shaft 35 is mounted coaxially of the filling spout, being supported for rotation in suitable bearings. The shaft carries a conveyor flight (not shown) to force material from the hopper positively through the spout.

To support a positioned bag during filling, plates 41 are secured on each side of the hopper structure 11. Arms 42 are connected to the plates, the arms depending from the plates to support a rest generally indicated at 43 for a bag. The distance between the rest 43 and the spout 34 is adjusted to suit the size of the container being filled. This is achieved in the machine shown by providing side arms 46 on each side of the rest and connecting these by removable bolts 47 at desired points. The ends of arms 42 are guided by hinged links 48 connected to the arms and to the frame 6 to prevent the hopper structure and the rest from swinging about pivots 13.

Suitable means are provided for retaining a container in filling position. The novel mechanism shown is particularly adapted for use with a valved bag. This includes bell crank 51 mounted at 52 between bracket 53 secured on the front of hopper 10. One end of the bell crank 51 is formed as a handle 54 while the other end 56 is faced with rubber 57 and is curved to fit over the valve portion of a bag, and hold it securely against the spout. To hold the bell crank in bag retaining position, a toggle 59 is connected between the handle portion of the bell crank and the bracket 53. This toggle is readily broken by an operator rocking inwardly to permit the bell crank to move. When another bag is positioned and handle 54 is rocked counterclockwise, the toggle moves into its locking position, that shown in Figure 1.

To operate the feed conveyor in the filling spout, a motor 61 is mounted on a frame 62 carried between the plates 42. A pulley 63 is provided on the motor shaft opposite a pulley 64 on shaft 35, a belt 66 connecting the pulleys so the motor is effective to rotate the screw conveyor.

To vibrate the bag during filling, rest 43 includes a frame 71 mounted on plates 46, the frame 71 extending forwardly from the plates. A shaft 72 is mounted in bearings 73 on the frame and is driven by a belt 74 extended about a pulley 75 on the motor shaft and another pulley 76 on shaft 72. At one end shaft 72 carries an eccentric 77 in engagement with a member 78 in the form of an arm which depends from the presently described bag saddle 79 and is engaged with the eccentric beneath the axis of shaft 72.

To support a bag for vibration, a bag chair or saddle 79 is mounted on the spring strip member 81 which is secured at one end to the saddle and, at its other end, to frame 71. Studs 80 are secured to the frame, springs 82 and 83 being positioned above and beneath plate 84 of saddle 79 to support the saddle with arm 78 in engagement with the eccentric so that when this is rotated, the saddle is vibrated rapidly and thus the bag on the saddle is vibrated.

In operation, with the motor operating, a bag in position and a supply of material available in container 16, an operator rocks the handle 20 to latch the gate 18 open. Material flows freely into hopper 10 from which the screw forces it through the spout and into the container or bag, the vibrator assisting the flow by vibrating the hopper and spout. As the bag fills, the material in the bag takes up the vibration to an increasing extent and the bagged material is packed tightly. The weight of the filled bag compresses springs 83 until finally member 78 is entirely free of eccentric 77 and the bag ceases vibrating. When the weight of material in the hopper and in the bag equals that to be weighed out, or very nearly so, the frame 7 moves up and extension 31 moves lever 24 to release lever 22. The gate then swings shut. The material continues to flow from the hopper 10 until this is empty, little further time being required before the bag can be removed and another placed in position. The operator then removes the bag after moving handle 54 to release position. Usually the motor is operated continuously.

I claim:

1. In a device of the character described, a weighing frame, a container support platform on said frame and including a container support yieldably mounted on said platform, a shaft rotatably mounted on said platform and having an eccentric thereon, a member depending from said container support to beneath said eccentric for engagement therewith, and means urging said container support in a direction to retain said depending member in engagement with the eccentric.

2. In a device of the character described, a weighing frame, a container support platform on said frame and including a container support yieldably mounted on said platform, a shaft rotatably mounted on said platform and having an eccentric thereon, a motor mounted on said frame for rotating said shaft, a member depending from said container support to beneath said eccentric for engagement therewith, and a spring positioned between said platform and said container support and urging said container support in a direction to retain said depending member in engagement with the eccentric.

3. In a device of the character described, a bag chair for holding a bag in position to be filled with material and movable over a path between a first position, wherein the bag is substantially free of any bag load, and a second position, wherein the chair sustains substantially a fully loaded bag; spring means supporting said bag chair and resisting movement of said bag chair from said first to said second position; a vibrator mounted in cooperative relation with respect to said bag chair for effectively vibrating said chair; an arm extending from said bag chair to engage said vibrator when said bag chair is in said first position and substantially to release said vibrator when said bag chair is in said second position, said arm being movable with said bag chair as said bag chair moves from said first to said second position whereby the engagement of said arm with said vibrator is progressively lessened as the load on the bag chair is increased.

4. In apparatus of the class described, a weighing device adapted for undergoing weighing movement; a main hopper having means for arresting a flow of material therefrom; an intermediate hopper suspended upon said weighing device and positioned for receiving material from said main hopper; a spout secured to and in communication with said intermediate hopper; a frame attached to said intermediate hopper; a bag chair for holding a bag in filling relation with said spout; resilient means for supporting said bag chair upon said frame and for holding said chair in a preselected normal position relative to said frame whereby said chair is progressively lowerable from such normal position in response to a progressively increasing load of material in such bag; a vibrator mounted upon said frame and positioned for engagement with said bag chair to vibrate the latter, said chair being movable out of engagement with said vibrator in response to the lowering thereof; said frame being effective to transfer at least a portion of the vibration of said vibrator to said intermediate hopper during the period of engagement of said vibrator with said chair; and a device for actuating the flow arresting means of said main hopper in response to weighing movement of said weighing device.

5. In an apparatus of the class described, a hopper; a filling spout secured to and in communication with said hopper; a frame rigidly attached to one of said elements; a bag chair for holding a bag in filling relation with said spout and moveable over a path between a first position, wherein the chair is substantially free of any bag load, and a second position, wherein the chair sustains substantially a fully loaded bag; spring supporting said bag chair from said first to said second position; a vibrator mounted on said frame; an arm depending from said bag chair to engage said vibrator when said bag chair is in said first position and substantially to release said vibrator when said bag chair is in said second position, said arm being movable with said bag chair as said bag chair moves from said first to said second position whereby the engagement of said arm with said vibrator is progressively lessened as the load on the bag chair is increased.

EDRIC W. VREDENBURG.

REFERENCES CITED

The following references are of record in the file of this patent:

UNITED STATES PATENTS

| Number | Name | Date |
|---|---|---|
| 1,070,388 | Bates | Aug. 19, 1913 |
| 1,861,443 | Holzapfel | June 7, 1932 |
| 1,995,140 | Andreas | Mar. 19, 1935 |
| 2,034,972 | Carlson | Mar. 24, 1936 |
| 2,392,204 | Vredenburg | Jan. 1, 1946 |
| 2,458,228 | Vredenburg | Jan. 4, 1949 |